United States Patent [19]

Bartholomew

[11] Patent Number: 5,626,371
[45] Date of Patent: May 6, 1997

US005626371A

[54] QUICK CONNECTOR WITH ONE-PIECE RETAINER

[76] Inventor: Donald D. Bartholomew, 35442 Jefferson, Mt. Clemens, Mich. 48045

[21] Appl. No.: 313,220

[22] PCT Filed: Apr. 2, 1992

[86] PCT No.: PCT/US92/02703

§ 371 Date: Sep. 23, 1994

§ 102(e) Date: Sep. 23, 1994

[87] PCT Pub. No.: WO93/20379

PCT Pub. Date: Oct. 14, 1993

Related U.S. Application Data

[63] Continuation-in-part of Ser. No. 465,773, Jan. 16, 1990, abandoned.

[30] Foreign Application Priority Data

Apr. 2, 1992 [WO] WIPO .................... PCT/US92/02703

[51] Int. Cl.$^6$ .................................................. F16L 39/00
[52] U.S. Cl. ................................... 285/319; 285/921
[58] Field of Search ........................... 285/319, 320, 285/921, 315

[56] References Cited

U.S. PATENT DOCUMENTS

| | | |
|---|---|---|
| 730,378 | 6/1903 | Lambert . |
| 921,691 | 5/1909 | Friday . |
| 922,132 | 5/1909 | Gold . |
| 938,731 | 11/1909 | Ward . |
| 1,542,421 | 6/1925 | Strongson . |
| 1,837,345 | 12/1931 | Thomas . |
| 1,976,589 | 10/1934 | Trickey . |
| 2,046,840 | 7/1936 | Phillips et al. . |
| 2,123,889 | 7/1938 | Gleason . |
| 2,441,344 | 5/1948 | Bosworth . |
| 2,585,887 | 2/1952 | Woodward . |
| 3,182,119 | 5/1965 | Millard . |
| 3,314,696 | 4/1967 | Ferguson et al. . |
| 3,450,424 | 6/1969 | Calisher . |
| 3,453,005 | 7/1969 | Foults . |
| 3,527,485 | 9/1970 | Goward et al. . |
| 3,534,988 | 10/1970 | Lindsey . |
| 3,538,940 | 11/1970 | Graham . |
| 3,553,817 | 1/1971 | Lallak . |
| 3,569,903 | 3/1971 | Brishka . |
| 3,574,359 | 4/1971 | Klein . |
| 3,584,902 | 6/1971 | Vyse . |
| 3,628,768 | 12/1971 | Hutt . |
| 3,711,125 | 1/1973 | Dehar . |
| 3,718,350 | 2/1973 | Klein . |
| 3,724,882 | 4/1973 | Dehar . |
| 3,780,773 | 12/1973 | Haugen . |
| 3,826,523 | 7/1974 | Eschbaugh . |
| 3,929,356 | 12/1975 | DeVincent et al. . |

(List continued on next page.)

FOREIGN PATENT DOCUMENTS

| | | |
|---|---|---|
| 2360921 | 6/1974 | Germany . |
| 2622269 | 11/1977 | Germany . |
| 634848 | 3/1950 | United Kingdom . |
| 693094 | 6/1953 | United Kingdom . |
| 718350 | 11/1954 | United Kingdom . |
| 781554 | 8/1957 | United Kingdom . |
| 791247 | 2/1958 | United Kingdom . |
| 1030535 | 5/1966 | United Kingdom . |
| 1145667 | 3/1969 | United Kingdom . |
| 1172348 | 11/1969 | United Kingdom . |
| 1343665 | 1/1974 | United Kingdom . |
| 1350546 | 4/1974 | United Kingdom . |
| 2011002 | 7/1979 | United Kingdom . |
| 2014115 | 8/1979 | United Kingdom . |

*Primary Examiner*—Terry Lee Melius
*Assistant Examiner*—Heather Shackelford
*Attorney, Agent, or Firm*—Harness, Dickey & Pierce

[57] ABSTRACT

A conduit assembly having a retainer with a ring and two pairs of arms. Both pairs of arms include shoulder-like portions which help to retain a seal within the housing, help to retain the conduit within the housing, and help to retain the retaining member within the housing.

19 Claims, 3 Drawing Sheets

U.S. PATENT DOCUMENTS

| | | |
|---|---|---|
| 3,929,357 | 12/1975 | DeVincent et al. . |
| 3,933,378 | 1/1976 | Sandford et al. . |
| 3,980,324 | 9/1976 | Bouteille et al. . |
| 4,005,883 | 2/1977 | Guest . |
| 4,009,896 | 3/1977 | Brewer . |
| 4,016,696 | 4/1977 | Mess et al. . |
| 4,080,752 | 3/1978 | Burge . |
| 4,111,464 | 9/1978 | Asano et al. . |
| 4,123,089 | 10/1978 | Viero et al. . |
| 4,123,091 | 10/1978 | Cosentino et al. . |
| 4,128,264 | 12/1978 | Oldford . |
| 4,135,745 | 1/1979 | Dehar . |
| 4,136,885 | 1/1979 | Uhrner . |
| 4,158,407 | 6/1979 | Rest . |
| 4,214,586 | 7/1980 | Mericle . |
| 4,219,222 | 8/1980 | Brusadin . |
| 4,220,361 | 9/1980 | Brandenberg . |
| 4,228,723 | 10/1980 | Cunningham . |
| 4,244,608 | 1/1981 | Stuemky . |
| 4,266,814 | 5/1981 | Gallagher . |
| 4,330,917 | 5/1982 | Dzurkovich . |
| 4,423,892 | 1/1984 | Bartholomew . |
| 4,483,371 | 11/1984 | Susin . |
| 4,483,543 | 11/1984 | Fisher, Jr. et al. . |
| 4,501,054 | 2/1985 | Morgan . |
| 4,524,995 | 6/1985 | Bartholomew . |
| 4,541,658 | 9/1985 | Bartholomew . |
| 4,601,497 | 7/1986 | Bartholomew . |
| 4,637,640 | 1/1987 | Fournier et al. . |
| 4,669,757 | 6/1987 | Bartholomew . |
| 4,679,832 | 7/1987 | Meinig . |
| 4,681,350 | 7/1987 | Gaita . |
| 4,681,351 | 7/1987 | Bartholomew . |
| 4,753,458 | 6/1988 | Case et al. . |
| 4,778,203 | 10/1988 | Bartholomew . |
| 4,834,423 | 5/1989 | DeLand . |
| 4,846,506 | 7/1989 | Bocson et al. . |
| 4,913,467 | 4/1990 | Washizu . |
| 4,915,136 | 4/1990 | Bartholomew . |
| 4,925,217 | 5/1990 | Ketcham . |
| 4,936,544 | 6/1990 | Bartholomew . |
| 4,944,536 | 7/1990 | Bartholomew . |
| 4,944,537 | 7/1990 | Usui et al. . |
| 4,946,205 | 8/1990 | Washizu . |
| 4,948,175 | 8/1990 | Bartholomew . |
| 4,981,586 | 1/1991 | Bartholomew . |
| 5,112,086 | 5/1992 | Gruber et al. .................... 285/319 X |
| 5,141,264 | 8/1992 | Usui ........................ 285/319 |
| 5,161,832 | 11/1992 | McNaughton et al. ................. 285/319 |

5,626,371

QUICK CONNECTOR WITH ONE-PIECE RETAINER

CROSS REFERENCE TO RELATED APPLICATION

This is a continuation-in-part application of U.S. Ser. No. 465,773, filed Jan. 1, 1990, now abandoned, entitled "Snap and Lock Quick Connector" by Bartholomew which is assigned to the assignee of the present invention.

BACKGROUND AND SUMMARY OF THE INVENTION

The present invention relates to a connector assembly which provides a snap and lock quick connection and which utilizes a one-piece retaining member. The one-piece retaining member helps to prevent the blow out of the O-rings and bushings.

In the automotive industry, as well as many other industries, there is a great need for low cost, reliable and easy to assemble components. This need is especially apparent with respect to providing a connection between fluid-carrying conduits, such as fuel or refrigerant lines. In older threaded connectors, substantial assembly time could be accumulated in screwing on a cap to a fitting and tightening the cap down to the proper torque needed to provide a fluid-tight seal. Further, an inventory would have to be maintained to keep track of the number of caps and fittings, and any liners or other components that may be necessary. Also, retightening of the caps may be required to maintain the seal after the automobile or other system has been put in use.

It is also desired in the case where the retaining member is pre-installed in the female to have the retaining member formed such that it is spread open by the male upon insertion. The retaining member accommodates tolerances of the male and permits movement of the male without seriously affecting the abutting function, because of the separated spring portion of the retaining member.

It is also desirable to have a one-piece retaining member which has a means for receiving and retaining a bushing between a male member and the interior of a female member, since a bushing not retained between a male member and female member tends to be expelled by the action of confined pressure.

Accordingly, it is an object of the present invention to provide an improved connector assembly which utilizes a one-piece retaining member for providing a quick connection between fluid conveying conduits.

Another object of the present invention is to provide a preassembled connector housing and one-piece retaining member so that a connection to a tubular fluid conveying conduit may be made in one step without resorting to any tools.

Another object of the present invention is to provide a pre-assembled connector housing and one-piece retaining member assembly so that a snapping connection may be made to a tubular fluid-conveying conduit.

It is another object of the present invention to provide a pre-assembled connector conduit unit which requires only a one-step snapping connection to be joined to a connector housing.

It is also an object of the present invention to provide an improved one-piece retaining member.

It is also an object of the present invention to provide an improved one-piece retaining member which operates to both secure the conduit in the axial bore of the housing and position the sealing means within the axial bore of the housing.

It is also a more specific object of the present invention to provide a connector assembly which uses a shoulder portion to secure the retaining member inside the housing.

It is a more specific object of the present invention to provide a one-piece retaining member which helps to prevent the high pressure blowout of the O-rings and bushings and which helps to form a fluid tight seal.

To achieve the foregoing objects, the present invention provides a snap and lock connector assembly which generally comprises a tubular conduit, a housing, and a one-piece retaining member with two pairs of arms having shoulder-like portions. The tubular conduit is adapted to convey fluid. The housing is formed with an axial bore for receiving the conduit at a first end and for providing a fluid path at a second end. The retaining member is disposed within the axial bore of the housing for providing a fluid tight seal between the confronting tubular conduit portions. In addition, the retaining member is adapted to be in contact with the housing to provide a locking mechanism. The housing also includes radially inward turned flange portions which abut the shoulder-like portions on the arms of the retaining member. Thus, the housing locks in the retaining member until the retaining member is released. The retaining member can be released by depressing the end portions, which causes flexion of the strips at the ring portion, thus allowing clearance between the inward turned flange portion of the housing and the shoulder-like portions of the arms.

In addition, the retainer can also be made and inserted within the housing such that the retaining member can only be released from the housing with the use of a special tool.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
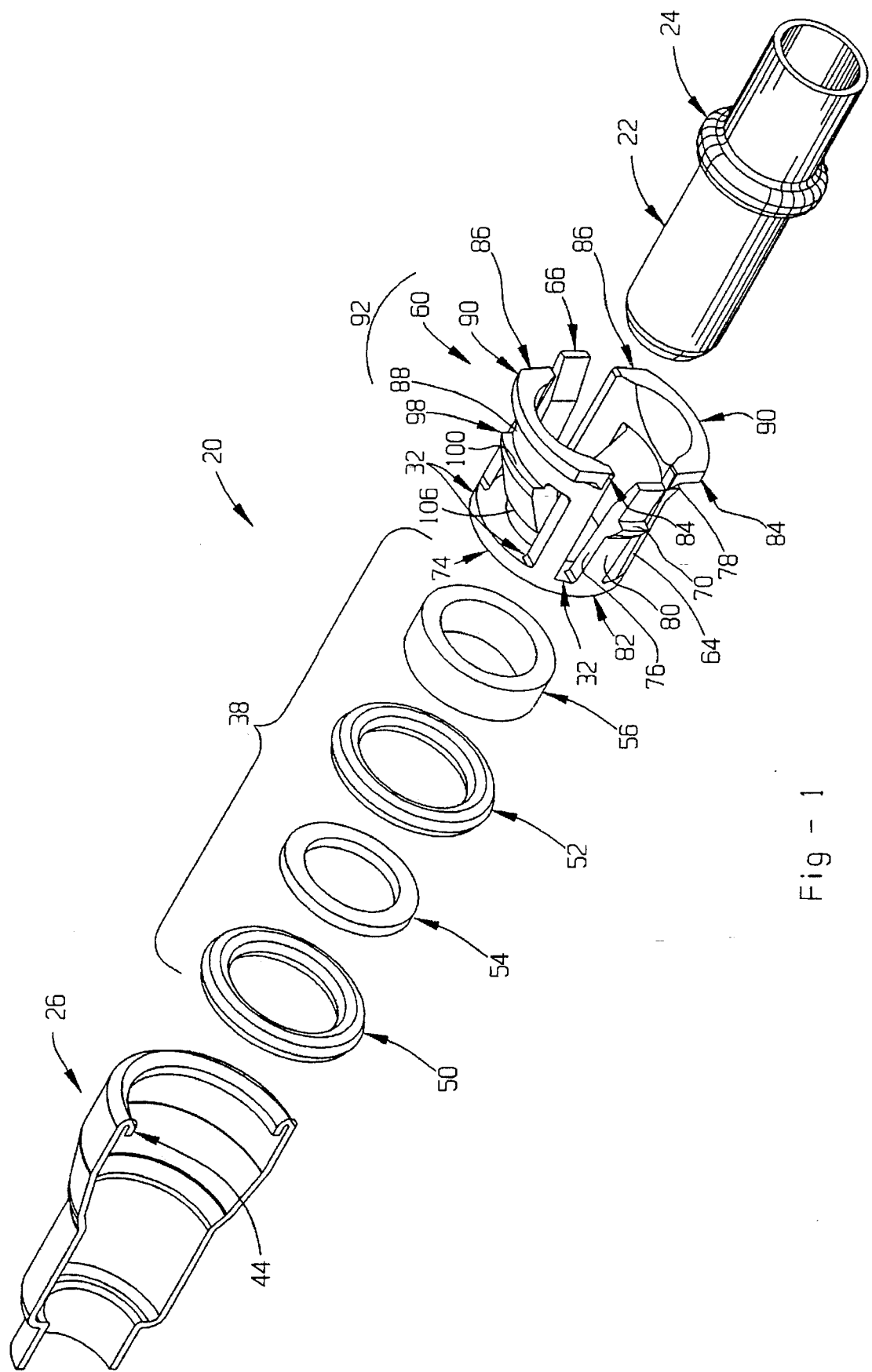
FIG. 1 is an exploded perspective view partially in section of the connector assembly.
Figure 2:
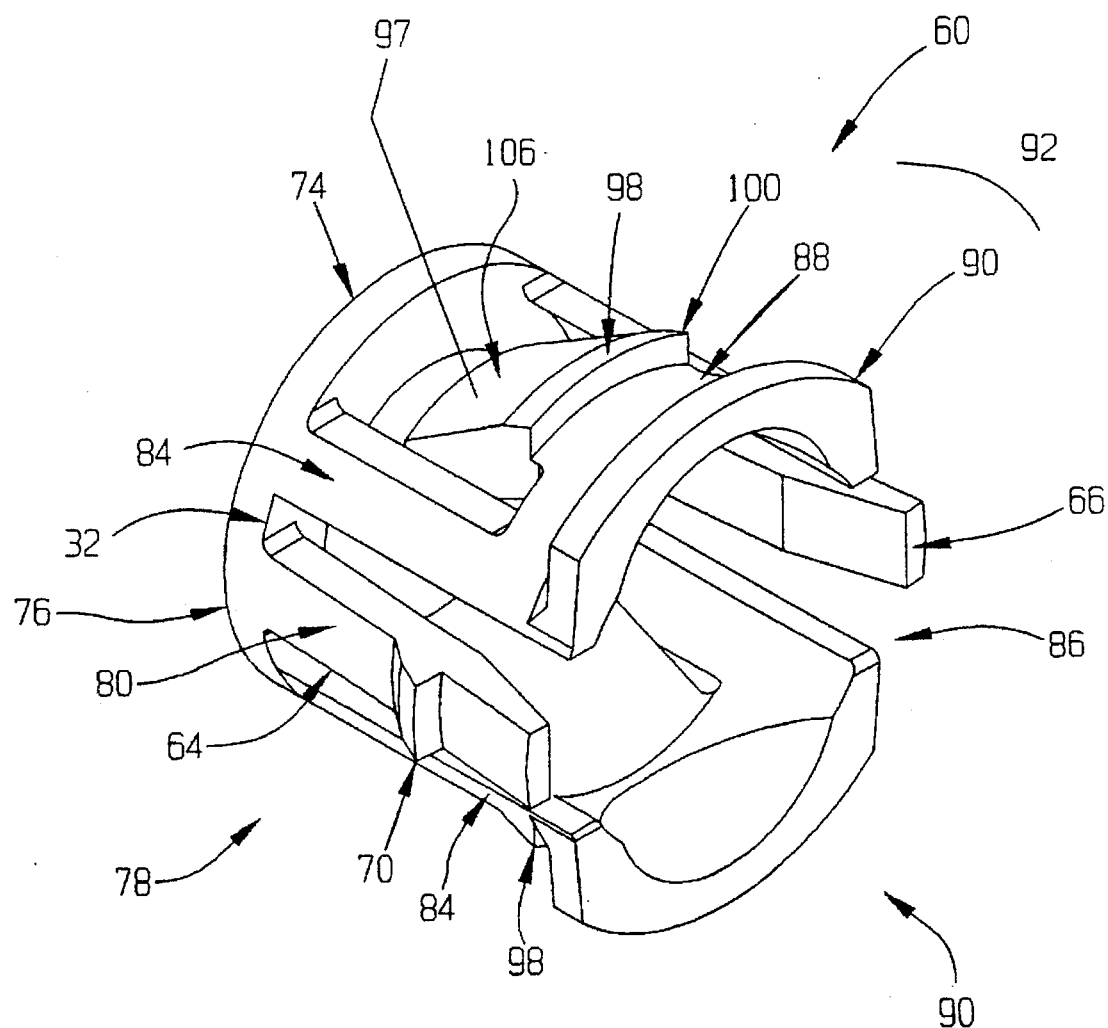
FIG. 2 is a perspective view of a retaining member in accordance with the present invention.

Referring to FIG. 1, an exploded perspective view of the connector assembly, and in FIG. 2, a perspective view of the retaining member, of the present invention, is shown. The connector assembly 20 is generally comprised of a female housing 26 and a one-piece retaining member 60. The housing 26 includes an axial bore 30 passing through the housing 26. The connector assembly 20 also includes a conduit 22 having an outward extending annular flange 24, positioned at a predetermined distance from the end of the conduit 22. The housing 26 has a radially inward turned flange 44 which coacts with the retaining member 60 and the annular flange 24 to retain the conduit 22 and the retaining member 60 within the female housing 26.

The sealing and bushing means 38 generally includes a pair of elastomeric O-rings 50 and 52 separated by a washer 54. The O-rings 50 and 52 and washer 54 are retained by a bushing 56. The O-rings 50 and 52 seal the tip of the conduit 22 within the housing 26.

The one piece retaining member 60 includes a ring portion 74 and two pairs of extending arms. The first pair of arms includes 76 and 78. The second pair of arms includes 64 and 66. The ring portion 74 is substantially flat and planar and one side 82 of the ring portion 74 abuts the bushing 56 to maintain the bushing 56 in position. The first pair of arms 76 and 78 extend substantially perpendicular from the other side of the ring portion 74. Although the one-piece retaining member 60 is a one piece molded element, joints 32 exist where the arms 76 and 78 extend from the ring portion 74, and the joints 32 help to allow for flexion as pressure is applied to the depressible end portions 92. The first pair of arms 76 and 78 have substantially identical configurations. Each arm is formed from a pair of extending strips 84 and 86. The strips 84 and 86 are connected by a leg portion 88 having an outwardly extending flange 90. The combination of the leg portion 88 and the flange 90 forms the end portion 92. A cantilevered tab 97 is formed on the leg portion 88. The end portion 92 and a shoulder-like portion 98 provide an overall "T" shape. The end portion 92 which connects the strips 84 and 86 acts as the cross member of the "T". In addition, the outwardly angularly extending shoulder-like portion 98 acts as the body portion of the "T".

The shoulder-like portion 98 has an overall shape that serves as a means for abutting the flange 24 to help retain the conduit 22 within the housing 26. In addition, shoulder-like portion 98 helps to maintain the retaining member 60 within the housing. The leading edge 106 of the shoulder portion 98 formed on the cantilevered tab 97 terminates at a flange abutting surface 107 which abuts the flange 24 of the conduit 22 once the conduit 22 is inserted into the housing 26. The shoulder-like portion 98 also has an opposing surface 100 which comes into relatively flat contact with the radially inward turned flange 44 of the housing 26, when the retaining member 60 is inserted into the housing 26.

The second pair of arms 64 and 66 also extend substantially perpendicular from the ring portion 74 on the same side as the first pair of arms 76 and 78. The second pair of arms 64 and 66 are located alternately between the first pair of arms 76 and 78. The arms 64 and 66 have substantially identical configurations and have a substantially planar shape. The body portion 80 of the arms 64 and 66 is substantially planar. The one-piece retaining member 60 is molded with the second pair of arms 64 and 66 extending from the ring portion 74.

Near the approximate middle portion of the body portion 80 of the arms 64 and 66 is a means 70 for abutting the radially inward turned flange 44 to help maintain the retaining member 60 within the housing 26. The means 70 is shoulder-like. The shoulder-like portion 70 has an overall shape that extends from the substantially planar arms 64 and 66. The shoulder-like portion 70 helps to retain the retaining member 60 in a position within the housing 26 which in turn maintains the bushing 56, washer 54 and O-rings 50 and 52 within the housing 26.

Figure 3:
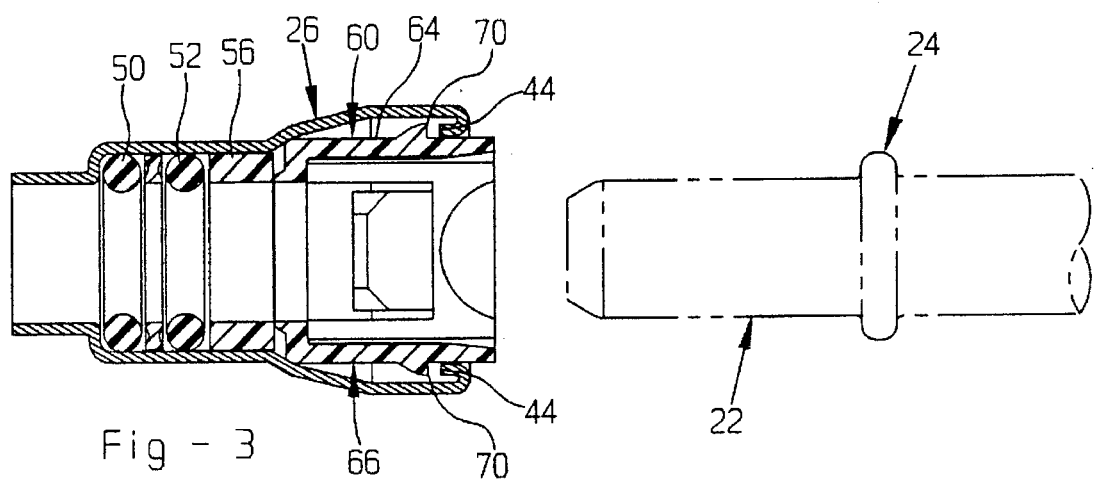
FIG. 3 is a side elevation view of the retaining member inserted into the housing member.

Referring to FIG. 3, a side elevational view of the retaining member 60 inserted within the housing 26 is illustrated. As the insertion of the retaining member 60 occurs, once the second pair of arms 64 and 66 clear the radially inward turned flange 44, the shoulder-like portion 70 of the second pair of arms 64 and 66 contacts the inward turned flange 44 of the housing 26. At this time the retaining member 60 is locked within the housing 26 and helps to prevent the high pressure blowout of the O-rings 50 and 52 and bushing 56. The O-rings 50 and 52 seal the tip of the conduit 22 within the housing 26.

Figure 4:
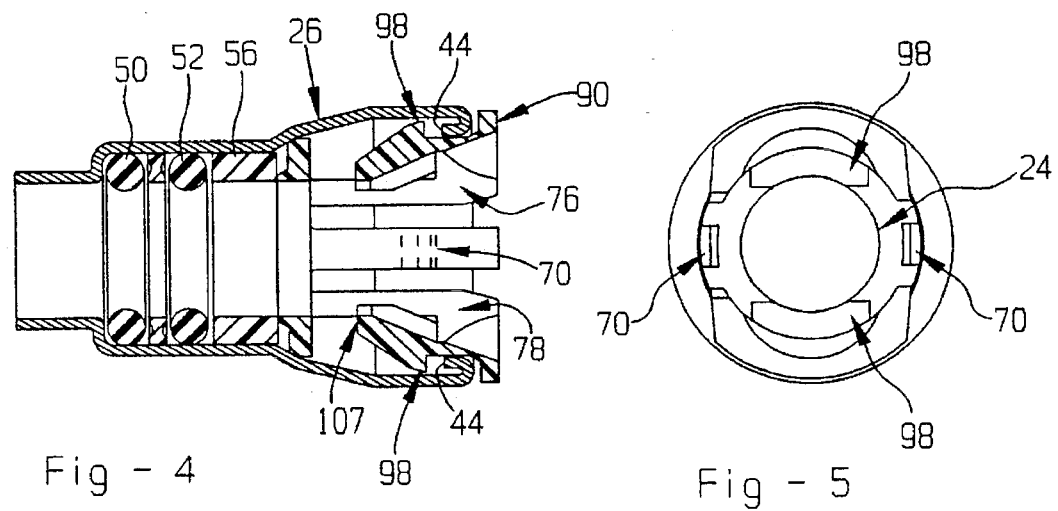
FIG. 4 is a side elevation view of the retaining member inserted into the housing member.

FIG. 4, also illustrates the side elevational view of the retaining member 60 inserted within the housing 26. FIG. 4 is a cross-section of the retaining member 60 inserted within the housing 26, rotated ninety degrees (90°) from the illustration in FIG. 3. In FIG. 4 the shoulder-like portions 98 of the first pair of arms 76 and 78 are abutting the inward turned flange 44 of the housing 26. The outwardly extending flange 90 of the end portion 92 may extend outside the housing 26.

A second embodiment of this invention would include a retaining member 60 having arms 76 and 78 wherein the arms 76 and 78 do not contain extending flanges 92 which extend outside of the housing 26.

Figure 5:
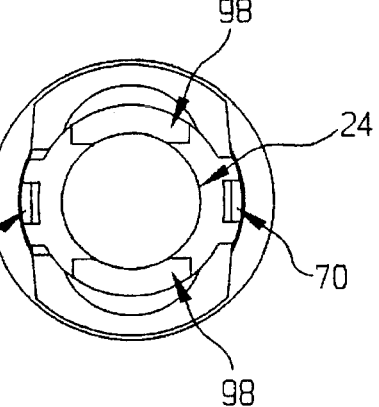
FIG. 5 is a sectional view, in cross-section, of the retaining member inserted into the housing member.

FIG. 5 is an end view of the retaining member inserted within the housing member. The shoulder-like portions 98 of the first pair of arms 76 and 78 are abutting the annular flange 24 of the conduit 22. The shoulder-like portions 70 of the second pair of arms 64 and 66 do not come into contact with the conduit 22.

Figure 6:
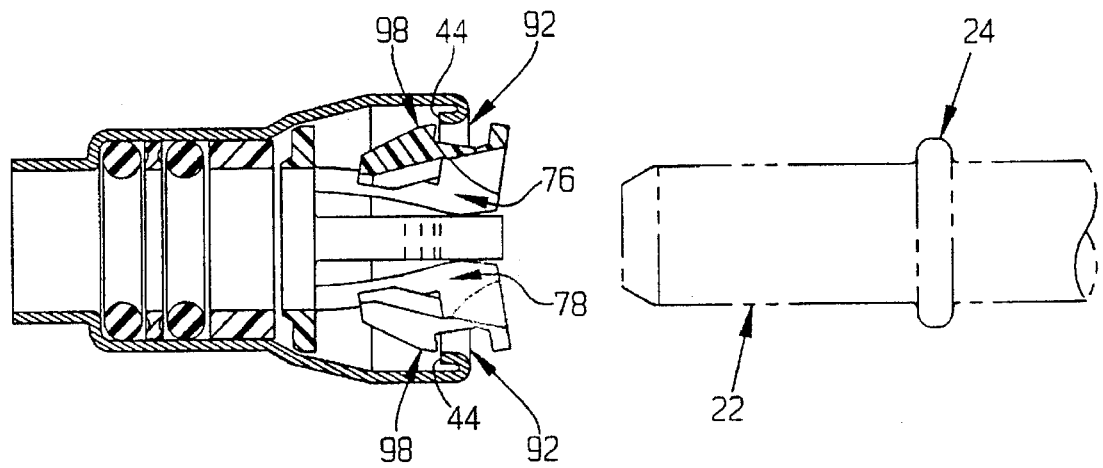
FIG. 6 is a side elevation view of the retaining member and housing member being separated.

FIG. 6 is a side elevational view of the retaining member 60 and the housing 26 upon separation. In order to separate the retaining member 60 and the housing member 26, pressure must be applied to the two end portions 92 of the retaining member 60 in order to pinch together the end portions 92. As the end portions 92 are pinched together, the shoulder portions 98 are provided with an adequate clearance of the radially inward turned flange 44. Thus, by simultaneously depressing the end portions 92 and pulling the retaining member 60 away from the housing 26, disconnection will occur.

In the second embodiment of this invention, the arms 76 and 78 do not contain extended flanges 92 which extend outside of the housing 26. Therefore, in order to separate the retaining member 60 and the housing member 26, a special tool must be utilized.

While the above detailed description describes the preferred embodiments of the present invention, it will be understood that the present invention is susceptible to modification, variation and alteration without deviating from the scope and fair meaning of the subjoined claims.

We claim:

1. A quick connector assembly comprising:

a conduit having a radially outward extending annular flange at a predetermined distance from an end of said conduit;

a housing having an axial bore formed therein for receiving said conduit, said housing having a radially inward turned flange;

seal means for sealing said conduit with said housing, said seal means positioned in said axial bore of said housing; and retainer means for retaining said conduit in said housing, said retainer means positioned in said housing axial bore and including a ring means for maintaining said sealing means in said housing, and a first pair of arms extending from said ring means, and a second pair of arms extending from said ring means, said ring means including an axial bore enabling passage of said conduit, and said second pair of arms alternating between said first pair of arms, each of said first pair of arms including a pair of spaced apart strips extending axially from said ring means, a leg portion spaced from said ring means and engaging both strips, and a cantilevered tab extending from said leg portion toward said ring means, said cantilevered tab having a ring means-facing annular flange abutting surface formed thereon.

2. The quick connector assembly according to claim 1, wherein said retainer means further comprises a one-piece retainer for maintaining said sealing means in said housing and for maintaining said conduit in said housing.

3. The quick connector assembly according to claim 1, wherein each arm from said first pair of arms being formed by a pair of strips, said strips being connected by a leg portion having an outwardly extending flange.

4. The quick connector assembly according to claim 1, wherein said second pair of arms extend from said ring means, said second pair of arms having an overall planar shape and an abutting means for abutting said radially inward turned flange of said housing.

5. The quick connector assembly according to claim 3, wherein each arm of said first pair of arms include a conduit abutting means.

6. The quick connector assembly according to claim 5, wherein said conduit abutting means is a shoulder-like portion having a shape with a leading edge for abutting said annular flange to retain said conduit in said housing and an opposing edge for abutting said housing to retain said retainer in said housing.

7. The quick connector assembly according to claim 4, wherein said abutting means is a shoulder-like portion.

8. The quick connector assembly according to claim 1, wherein at least one pair of said arms does not project outside said housing.

9. A quick connector assembly comprising:
a conduit having a radially outward extending annular flange at a predetermined distance from an end of said conduit;
a housing having an axial bore formed therein for receiving said conduit;
seal means for sealing said conduit with said housing, said seal means positioned in said axial bore of said housing;
a retainer means for retaining said conduit in said housing, said retainer means positioned in said housing axial bore, said retainer means including a ring means for maintaining said sealing means in said housing, said ring means including an axial bore for enabling passage of said conduit;
a first pair of arms extending from said ring means, each arm from said first pair of arms being formed by a pair of strips, said strips being connected by a leg portion axially spaced apart from said ring means having an outwardly extending flange, said arms also having a conduit abutting means;
a second pair of arms extending from said ring means, said second pair of arms having an overall planar shape, and an abutting means; and
said first pair of arms alternating between said second pair of arms.

10. A quick connector assembly comprising:
a conduit having a radially outward extending annular flange at a predetermined distance from an end of said conduit;
a housing having an axial bore formed therein for receiving said conduit;
seal means for sealing said conduit with said housing, said seal means positioned in said axial bore of said housing; and
retainer means for retaining said conduit in said housing, said retainer means positioned in said housing axial bore and including a ring means for maintaining said sealing means in said housing, a first pair of arms extending from said ring means, and a second pair of arms extending from said ring means, each arm from said first pair of arms being formed by a pair of strips, said strips being connected by a leg portion axially spaced apart from said ring means having an outwardly extending flange, said ring means including an axial bore enabling passage of said conduit, and said second pair of arms alternating between said first pair of arms.

11. The quick connector assembly according to claim 10 wherein said retainer means further comprises a one-piece retainer for maintaining said sealing means in said housing and for maintaining said conduit in said housing.

12. The quick connector assembly according to claim 10 wherein said second pair of arms extend from said ring means, said second pair of arms having an overall planar shape and an abutting means for abutting said seal means and thereby retaining said seal means within said housing.

13. The quick connector assembly according to claim 10 wherein each arm of said first pair of arms include a conduit abutting means.

14. The quick connector assembly according to claim 13 wherein said conduit abutting means is a shoulder-like portion having a shape with a leading edge for abutting said annular flange to retain said conduit in said housing and an opposing edge for abutting said housing to retain said retainer in said housing.

15. The quick connector assembly according to claim 12, wherein said abutting means is a shoulder-like portion.

16. The quick connector assembly according to claim 10, wherein at least one pair of said arms does not project outside said housing.

17. A quick connector assembly comprising:
a conduit having a radially outward extending annular flange at a predetermined distance from an end of said conduit;
a housing having an axial bore formed therein for receiving said conduit, said housing having a radially inward turned flange;
seal means for sealing said conduit with said housing, said seal means positioned in said axial bore of said housing; and
retainer means for retaining said conduit in said housing, said retainer means positioned in said housing axial bore and including a ring means for maintaining said sealing means in said housing, said ring means including a ring, and a first pair of arms extending from said ring means, and a second pair of arms extending from said ring means, said ring means including an axial bore enabling passage of said conduit, and said second pair of arms alternating between said first pair of arms, said first pair of arms extending substantially between said flange of said housing and said annular flange of said conduit when said conduit is held within said housing and said second pair of arms extending substantially between said flange of said housing and said ring means, each of said first pair of arms including a leg portion axially spaced apart from said ring means and a cantilevered tab extending from said leg portion toward said ring, said cantilevered tab having a ring means-facing annular flange abutting surface formed thereon, said annular flange abutting surface being spaced apart from said ring.

18. The quick connector assembly according to claim 17, wherein said retainer means further comprises a one-piece retainer for maintaining said sealing means in said housing and for maintaining said conduit in said housing.

19. The quick connector assembly according to claim 17, wherein said retainer means includes a surface for engaging said seal means.

* * * * *